United States Patent [19]

Lawless

[11] 4,356,235

[45] * Oct. 26, 1982

[54] THALLOUS AND CESIUM HALIDE MATERIALS FOR USE IN CRYOGENIC APPLICATIONS

[76] Inventor: William N. Lawless, c/o Lake Shore Ceramics, Inc., 64 E. Walnut St., Westerville, Ohio 43081

[ * ] Notice: The portion of the term of this patent subsequent to Oct. 20, 1998, has been disclaimed.

[21] Appl. No.: 289,555

[22] Filed: Aug. 3, 1981

Related U.S. Application Data

[63] Continuation-in-part of Ser. No. 41,039, May 21, 1979, Pat. No. 4,296,147.

[51] Int. Cl.$^3$ .............................................. B32B 15/00

[52] U.S. Cl. .................................... 428/379; 427/117; 427/120; 428/389

[58] Field of Search ............... 428/375, 379, 402, 389; 427/117, 120; 174/126 S, 128 S; 62/55.5; 423/116, 126, 495; 252/70

[56] References Cited

U.S. PATENT DOCUMENTS 4,171,464 10/1979 Steyert ................................ 428/379
4,296,147 10/1981 Lawless ............................... 428/402

*Primary Examiner*—Marion McCamish
*Attorney, Agent, or Firm*—Biebel, French & Nauman

[57] ABSTRACT

Certain thallous and cesium halides, either used alone or in combination with other ceramic materials, are provided in cryogenic applications such as heat exchange material for the regenerator section of a closed-cycle cryogenic refrigeration section, as stabilizing coatings for superconducting wires, and as dielectric insulating materials. The thallous and cesium halides possess unusually large specific heats at low temperatures, have large thermal conductivities, are nonmagnetic, and are nonconductors of electricity. They can be formed into a variety of shapes such as spheres, bars, rods, or the like and can be coated or extruded onto substrates or wires.

5 Claims, 6 Drawing Figures

THALLOUS AND CESIUM HALIDE MATERIALS FOR USE IN CRYOGENIC APPLICATIONS

This application is a continuation-in-part of U.S. application Ser. No. 41,039, filed May 21, 1979, now U.S. Pat. No. 4,296,147.

This invention relates to nonmagnetic dielectric compositions of matter which have large specific heats at low temperatures and their use in low-temperature, cryogenic applications.

The development and use of low temperature processes has greatly expanded in recent years. The space program has spurred action in liquefaction of many different gases including nitrogen, oxygen, helium, and hydrogen. Additionally, the liquefaction of natural gas for large-scale ship transport has been greatly increased as demands for energy in this country have grown.

In many cryogenic applications, the materials used must have large specific heats at the low operating temperatures encountered. For example, the solid packing material used as a heat exchange medium in the regenerator section of closed-cycle stirling-type refrigerators must not only be mechanically stable, but also must have a high specific heat at low temperatures to match closely the specific heat of the refrigerant being utilized for maximum operating efficiency. This is particularly true when helium gas is the refrigerant because at temperatures below about 20° K., its specific heat becomes very large. A specific heat mismatch between the solid packing material and refrigerant results in a loss of efficiency.

Other cryogenic applications also require materials with a large low-temperature specific heat. The specific heats of all of the materials used as superconducting wires are quite small at low temperatures. Therefore, the application of a coating of a material with a large specific heat at low temperatures will result in improved thermal stability of the superconductor. Still other cryogenic applications may require materials with special combinations of properties. These properties include a large thermal conductivity at low temperatures, mechanical stability, resistance to cyclic fatigue or cryogenic embrittlement, a nonmagnetic nature, and a nonconductor of electricity.

A large number of prior art materials have one or more of the above properties. These include lead (Pb) which is nonmagnetic and has a large low-temperature specific heat, neodymium (Nd), europium selenide (EuSe), and alloys of erbium, gadolinium, and rhodium (Er-Gd-Rh). However, all of these materials are electrical conductors; in fact, lead is a superconductor at low temperatures.

Even though lead is the most widely used material, it suffers from several shortcomings. It is a relatively soft material with poor creep and impact fatigue properties. In use in the regenerator section of cryogenic cooling systems it tends to degrade into a powder because of cyclic fatigue, and cryogenic embrittlement. Even when hardened by the addition of small amounts (up to 4%) of antimony and made into small spheres, the breakdown of the spheres into powder shortens the useful life of lead as a heat exchange material in a cryogenic regenerator.

Thus, although some of the materials used by the prior art have one or more of the desirable properties, to my knowledge prior to my invention there were no nonmagnetic dielectric insulating materials having large low-temperature specific heats in use in the art. Accordingly, the need exists in the art for an improved material for use in cryogenic applications which has a large low-temperature specific heat as well as mechanical stability. Additionally, there is a need for a material which combines the above properties with those of being nonmagnetic and a nonconductor of electricity which can be adapted to a wider range of utilities at cryogenic temperatures.

SUMMARY OF THE INVENTION

In accordance with the present invention, thallous and cesium halides, either alone or combined with other high specific heat ceramics such as those described in U.S. Pat. No. 4,231,231 entitled "Cryogenic Ceramic and Apparatus" can be utilized in a variety of cryogenic applications. The thallous and cesium halides are pure, single-phase, polycrystalline materials made by processes known in the art. They can easily be made 100% dense and are somewhat ductile in character enabling them to be extruded onto wires and other substrates.

It has been found that the thallous and cesium halides possess a unique combination of properties which render them admirably suitable for use as heat exchange material in the regenerator section of cryogenic refrigerating systems, as stabilizing coatings for superconducting transmission lines, and as dielectric insulating materials. The thallous and cesium halides have large heat capacities which compare favorably with those of lead at low temperatures. They have thermal conductivities of approximately that of lead at temperatures between 7° and 15° K. and closely approach or exceed the thermal conductivity of lead below 7° K. Additionally, the thallous and cesium halides have good mechanical stability, a nonmagnetic nature, and are nonconductors of electricity. They may be used in cryogenic devices as powders, spheres, bars, or plates, or may be coated or extruded directly onto other surfaces. If formed into spheres, the spheres should have a diameter preferably of, but not exclusively, from 0.001 to 0.015 inches.

Accordingly, it is an object of the present invention to provide a class of materials useful in low temperature applications and possessing a combination of properties not attainable in the prior art and to provide methods for using such materials in cryogenic processes. These and other objects and advantages of the invention will become apparent from the following description, the accompanying drawings, and the appended claims.

DESCRIPTION OF THE PREFERRED EMBODIMENTS

Figure 1:
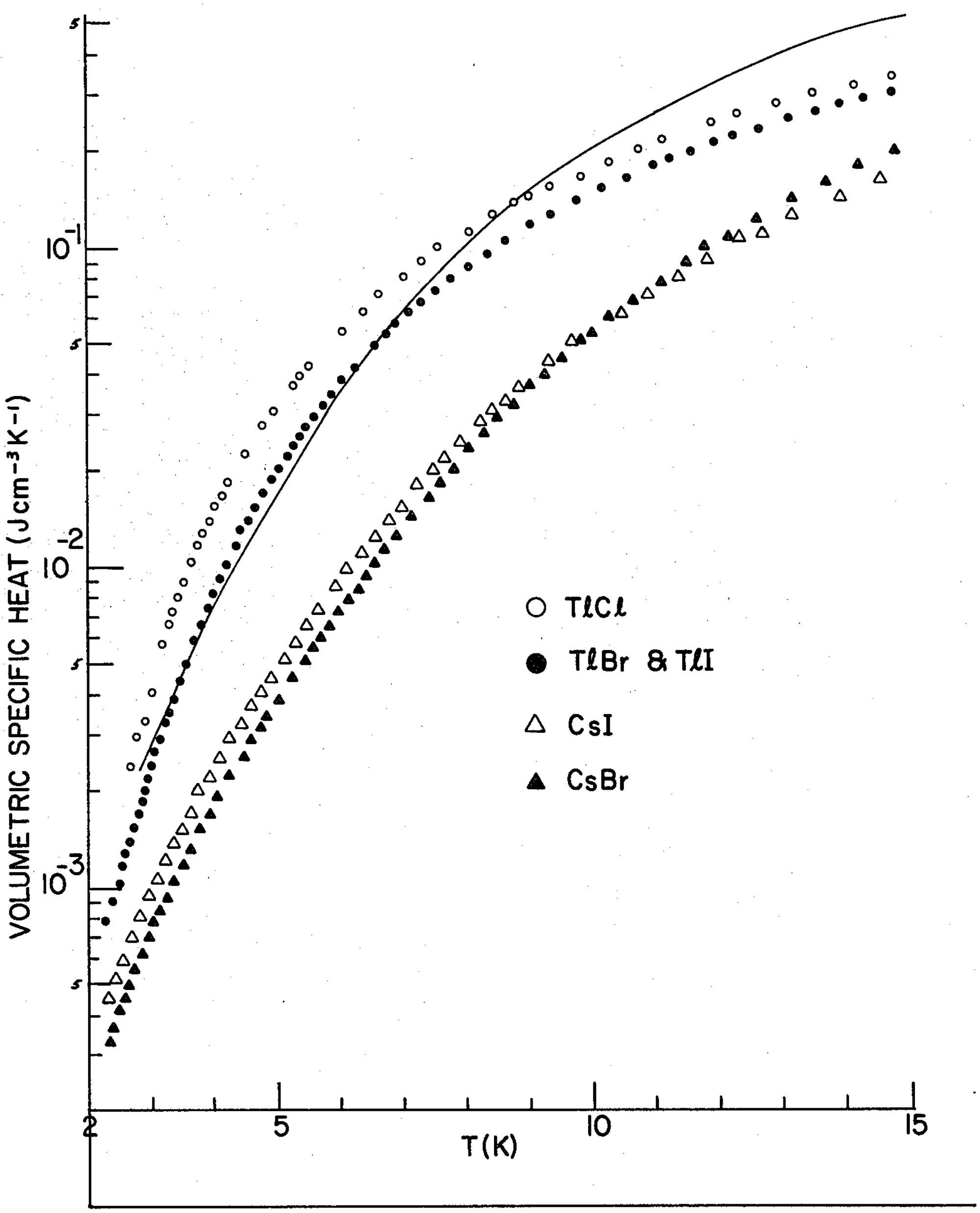
FIG. 1 is a graph of the volumetric specific heat of various thallous and cesium halides in Joules per cubic centimeter per degree Kelvin versus temperature in degrees Kelvin and includes for comparison purposes specific heat data for lead.

The thallous and cesium halides of the present invention and their methods of preparation are per se known. The thallous chlorides, bromides, and iodides are available as crystalline materials and have melting points of from 327° C. to 430° C. Cesium bromide and iodide are also available as crystalline materials and have melting points of 636° C. and 621° C., respectively. However, because of their instability and hygroscopic properties, thallous fluoride, cesium fluoride, and cesium chloride are impractical for use in the present invention.

Because of their ductility and flexibility, the thallous and cesium halides of the present invention can easily be densified and formed into spheres or other shapes utilizing standard ceramic methods. Individual thallous or cesium halide compounds or mixtures of them may be formed into structural shapes by pressing finely divided powders in a die at room temperature and then firing at sintering temperatures. Well known fugitive organic binders may optionally be added to the powders to aid in the plastic formability of the compositions although this is not necessary. Such organic binders volatilize at or below the sintering temperatures utilized and form no part of the final structure.

Moreover, the thallous and cesium halides may be extruded onto wires or other substrates by heating them near their respective melting points and forcing them and the wire or other substrate simultaneously through a die orifice. Additionally, the thallous and cesium halides of the present invention can be dip coated onto wires or other substrates by passing the wire or substrate through a molten bath of the coating material.

Additionally, the thallous and cesium halides of the present invention may be hardened by the addition of effective amounts (i.e., less than about 10% by weight) of a valency controlled dopant material. Such dopants and their hardening effects on alkali halides are known. Examples of such dopants are silver chloride and tin chloride.

In an alternative embodiment, the thallous and cesium halides of the present invention may be mixed with the family of large low-temperature specific heat ceramic materials disclosed in U.S. Pat. No. 4,231,231 entitled "Cryogenic Ceramic and Apparatus." The ceramic materials there disclosed consist of crystalline metal oxides defined by one of the following molar formulas:

1. $AB_2O_4$, where A is selected from one or more of Group 2B metal ions alone or in combination with one or more of other divalent metal ions where at least about 90 mole % of A is a Group 2B metal ion or ions, and B is either chromium or chromium plus one or more other trivalent metal ions where at least about 90 mole % of B is chromium;

2. $AB_2O_6$, where A is selected from one or both of manganese or nickel ions alone or in combination with one or more other divalent metal ions, where at least 90 mole % of A is manganese or nickel and B is selected from one or both of niobium or tantalum ions; and 3. $A_2BCO_6$, where A is selected from lead ion alone or in combination with one or more other divalent metal ions where at least about 90 mole % of A is lead ion, B is either gadolinium or manganese alone or in combination with one or more other trivalent metal ions where at least about 90 moles % of B is gadolinium or manganese ion, and C is selected from one or both of niobium and tantalum ions.

This family of ceramics has been demonstrated to be dielectric insulators having values of specific heat at least as great as that of lead at temperatures below 15° K. These ceramics can be easily fabricated as taught in the above patent by mixing powders of the oxides of the metals in proper molar proportions and then calcining and sintering at temperatures in the range of from 900° to 1500° C.

Referring now to FIG. 1, it can be seen that the specific heats of the thallous halides are equal to or in excess of the literature-reported values for lead. The cesium halides have only somewhat smaller specific heat values than lead. The specific heats shown in the Figures are plotted on a volumetric basis which is the most demanding basis of comparison with lead because of its extremely high density. The data for lead shown in FIGS. 1 and 2 was estimated by using the following specific heat expression for metals:

$$C=C_D(\theta_D/T)+\delta T$$

where $C_D$ is the Debye function, $\theta_D$ is the Debye temperature, and $\delta$ is the coefficient of electronic contribution. Values for $\theta_D$ of 108° K. and $\delta$ of $3.36\times10^{-3}$ J mole$^{-1}$ K$^{-2}$ were taken from Gopal, Specific Heats at Low Temperatures, p. 63 (Plenum Press, 1965).

Figure 2:
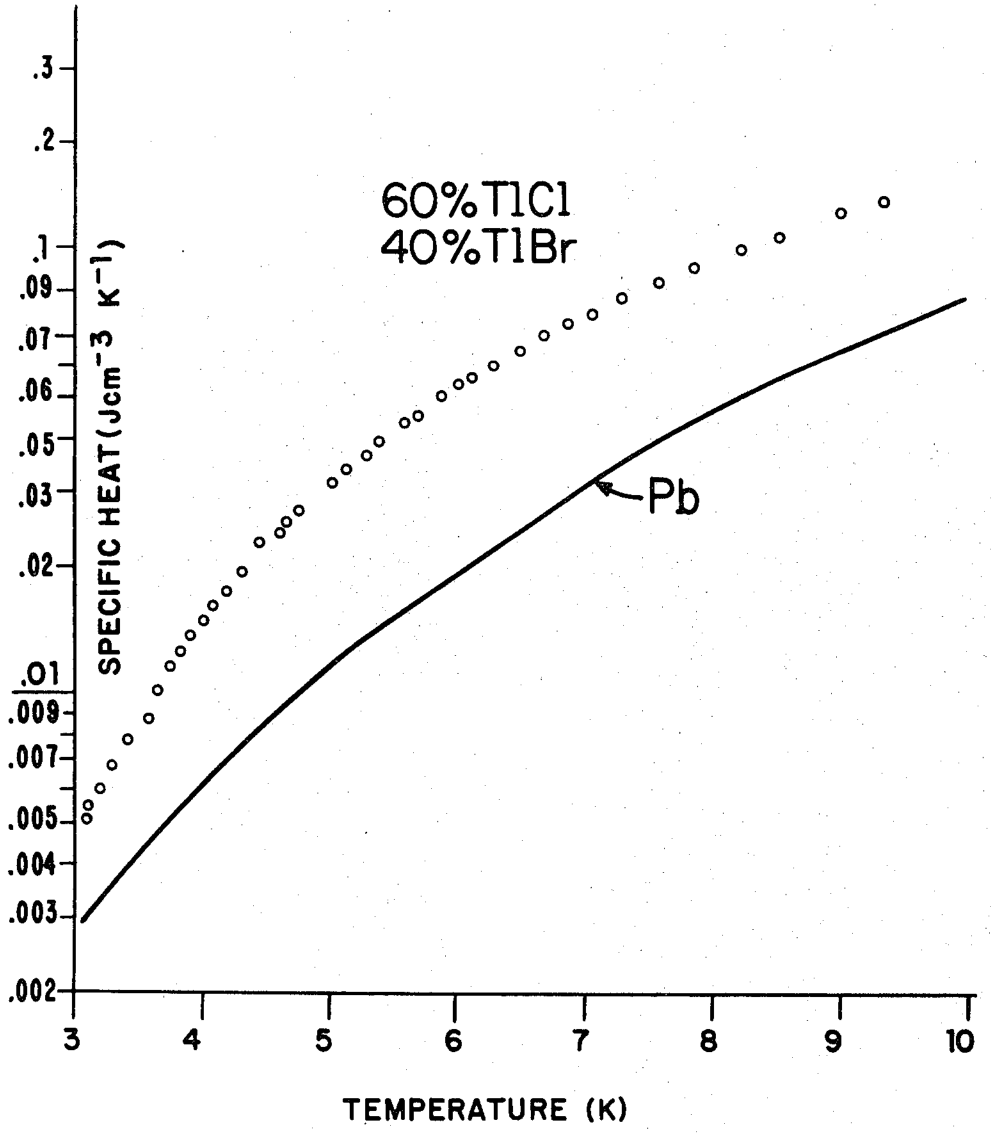
FIG. 2 is a graph of the specific heat in Joules per cubic centimeter per degree Kelvin of a mixture of 60 mole % thallous chloride and 40 mole % thallous bromide versus temperature in degrees Kelvin with specific heat data for lead included for comparison purposes.

As illustrated in FIG. 2, solid solutions of mixtures of thallous halides also possess large specific heat values. The specific heat of a solid solution of 60 mole % thallous chloride and 40 mole % thallous bromide is shown to have a specific heat in excess of that of lead and temperatures below about 10° K.

The thallous and cesium halides also have high thermal conductivities at low temperatures. FIGS. **3*a* and 3*b*** illustrate the thermal conductivities of thallous chloride, thallous bromide, thallous iodide, cesium bromide, and cesium iodide at temperatures in the range of 2°-20° K. As can be seen, the thermal conductivities of both the thallous and cesium halides are quite large at a superconductor operating temperature of 4°-5° K. For comparison purposes, the reported thermal conductivities of copper and lead at 4°-5° K. are 3-4 Wcm $^{-1}$°K$^{-1}$ and 0.6-0.7 Wcm $^{-1}$°K$^{-1}$, respectively.

Figure 4:
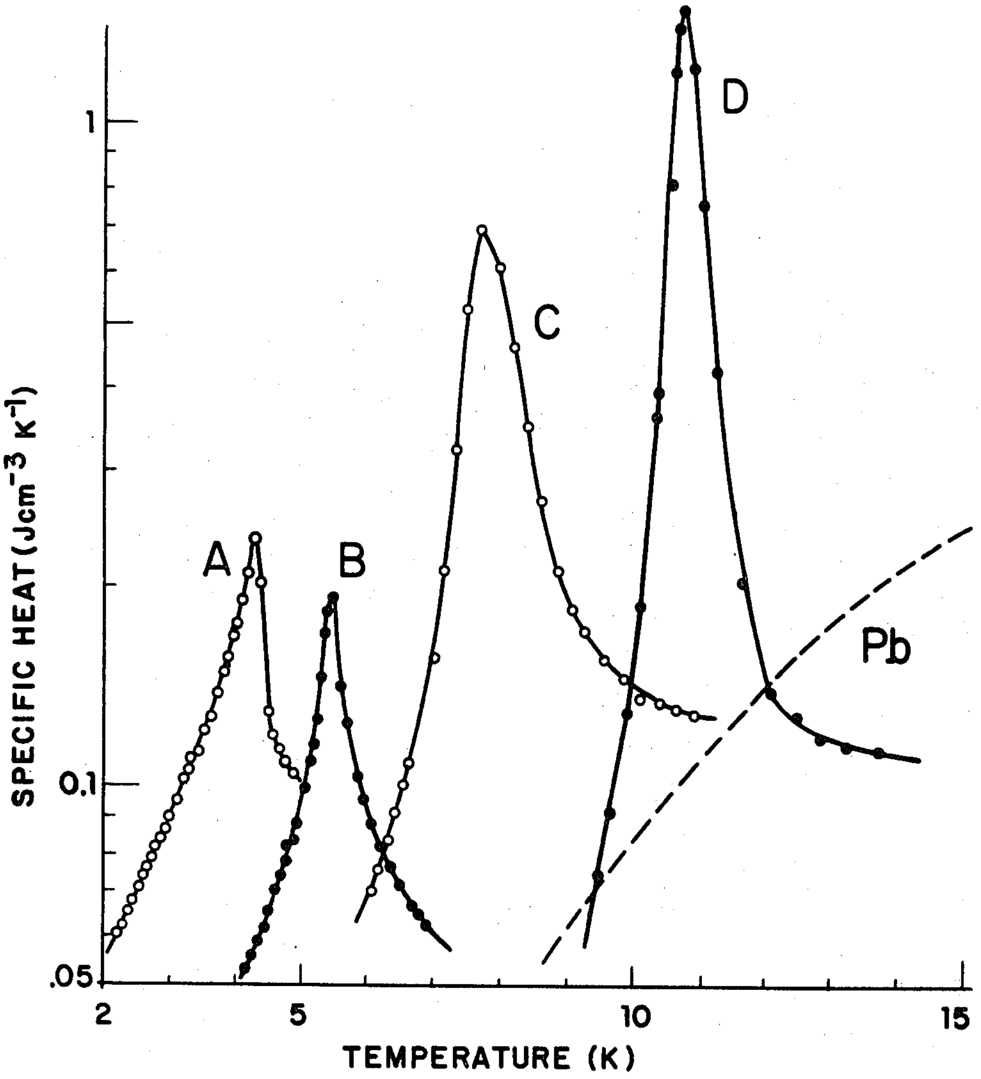
FIG. 4 is a graph of the specific heats in Joules per cubic centimeter per degree Kelvin of ceramics A-D described in U.S. Pat. No. 4,231,231 versus temperature in degrees Kelvin with specific heat data for lead included for comparison purposes.

Referring now to FIG. 4, the volumetric specific heats of four exemplary ceramic compositions from U.S. Pat. No. 4,231,231 are shown in comparison with that of lead. The ceramic composition labeled A is $MnNb_2O_6$, composition B is $NiNb_2O_6$, Composition C is $Cd_2Cr_3NbO_9$, and D is $Zn_2Cr_3NbO_9$. As can be seen, each individual ceramic composition has a maximum specific heat at a different temperature. For example, the specific heat of ceramic C has a maximum at about 8° K. of about 0.7 Joules per cubic centimeter per degree Kelvin.

Figure 5:
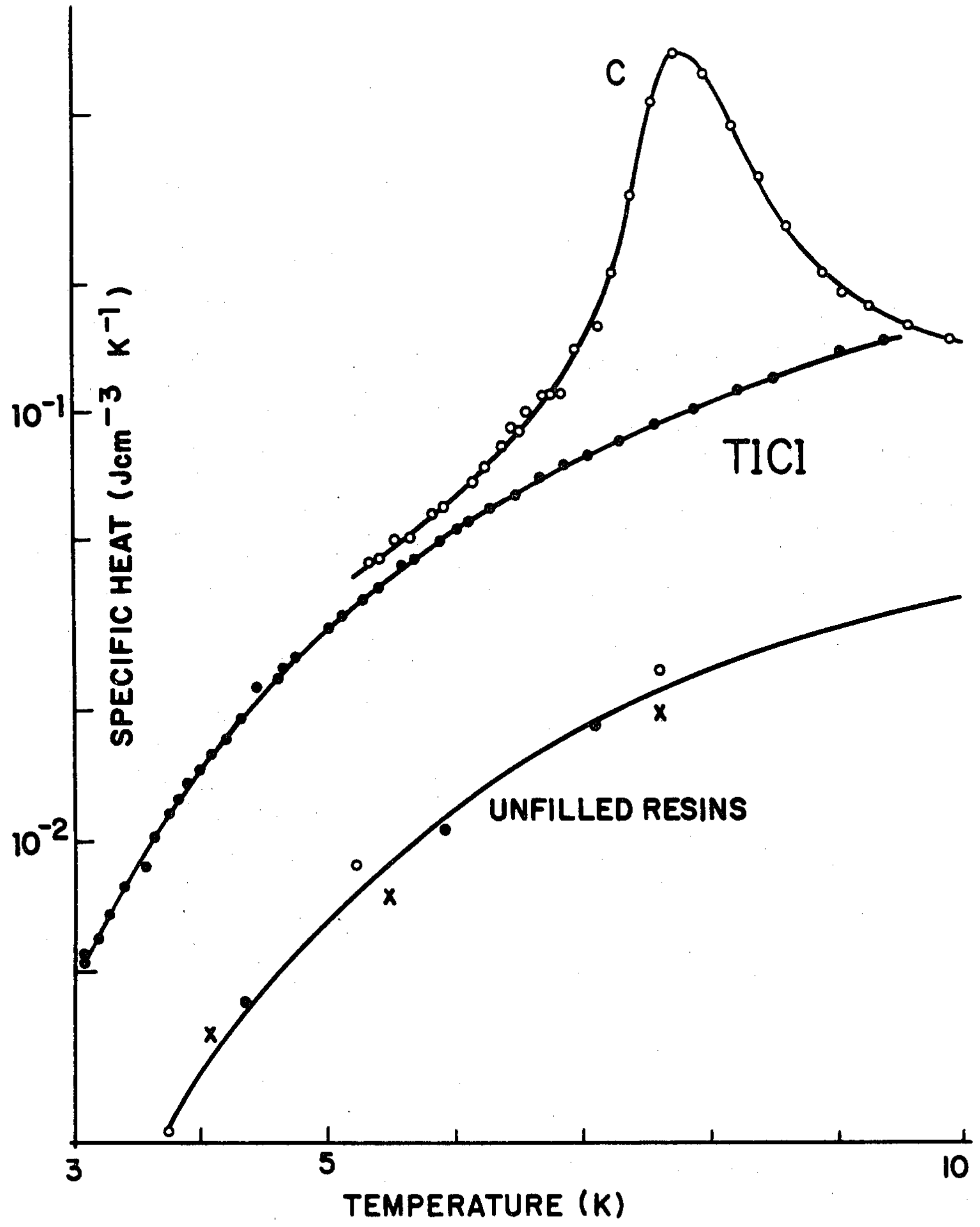
FIG. 5 is a graph of the specific heats in Joules per cubic centimeter per degree Kelvin of ceramic C and thallous chloride versus temperature in degrees Kelvin with specific heat data for epoxy resins included for comparison purposes.

As shown in FIG. 5, the volumetric specific heats of thallous chloride and ceramic C are significantly greater than those reported by Hartwig, Paper U-9, Cryogenic Engineering Conference, Queens' University, Kingston, Ontario (1975), for various unfilled epoxy resins. As illustrated in FIG. 5, the open circles signify data from an epoxy resin identified as Cy221-HY979 by Hartwig; closed circles, X183/2476-HY905; and crosses, CY221-HY956. As shown, at 8° K., the specific heat of thallous chloride is 4.4 times larger than that of epoxy resins and the specific heat of ceramic C is 28 times larger on a volumetric basis.

These properties illustrate the significant advantages which are obtained by using thallous and cesium halides alone or in a composite solid solution mixture with the ceramics disclosed in U.S. Pat. No. 4,231,231. This is because the windings most often utilized to insulate superconducting wires presently are epoxy resins such as Araldite epoxy resin available from General Electric Co., Schenectady, N.Y. The materials of the present invention not only have much greater specific heats at low temperatures than do the presently utilized epoxy resins, they additionally possess much greater dielectric constants, thermal conductivities, and enthalpies which will serve to provide better thermal damping of temperature fluctuations, better electrical insulation, and improved enthalpy stabilization of the superconducting wires. The thallous and cesium halide materials of the present invention can also be combined with such epoxy resins in forming insulation for superconducting wires.

The dielectric constants of the thallous halides and ceramic C are unusually large, approximately 37 for thallous chloride and approximately 300 for ceramic C. By comparison, the dielectric constants of glasses and epoxies are in the range of from 3 to 5. Moreover, the enthalpies of both the thallous halides and the ceramics disclosed in U.S. Pat. No. 4,231,231 are substantially greater than the presently used epoxy resins. Examplary enthalpy data relative to 4° K. for thallous chloride and ceramic C are reported in Table I below which illustrate the significant differences relative to an Araldite epoxy resin.

TABLE I

Enthalpy Improvements Over Araldite Epoxy Resin (Relative to 4° K.)

| Temperature (oK) | Enthalpy Ratios to Epoxy: Thallous Chloride | Enthalpy Ratios to Epoxy: Ceramic C |
|---|---|---|
| 6 | 6.7 | 8.2 |
| 7 | 6.5 | 9.0 |
| 8 | 6.3 | 17.7 |
| 9 | 6.2 | 16.9 |

As can be seen, the enthalpies of thallous chloride vary from 6.2 to 6.7 times greater than that of an Araldite epoxy resin at typical operating temperatures for superconducting wires. The enthalpies of Ceramic C are even greater.

The excellent low-temperature specific heat and thermal conductivity properties of the thallous and cesium halides and the unusually high dielectric constants and enthalpies for the family of ceramic materials reported in U.S. Pat. No. 4,231,231 can be combined advantageously to provide a series of materials having optimum properties for operation at a given temperature. Windings for superconducting wires made of composites of the thallous or cesium halide materials and the ceramics can be made, for example, by spraying a superconducting wire with the desired composite mixed with a fugitive organic binding material which is subsequently burnt out. Alternatively, the wire may be dipped in a mixture of the composite and organic binder. In still another alternative method, the composite may be vacuum deposited on the surface of the wire using known techniques. The final thickness of the coating may be ½ to 1/50 times the diameter of the wire.

Because of their ductility, the thallous and cesium halides of the present invention can themselves be used, individually or in mixtures, as insulators for superconducting wires. An important consideration in insulating superconducting wires is the variation in properties, if any, of the insulating coating as its thickness is varied. The specific heat of a composition is not thickness dependent. However, the thermal conductivity of a composition may be thickness dependent because thermal conductivity, K, is related to specific heat, C, by the equation:

$$K=(\tfrac{1}{3})Cv\lambda$$

where v is the average sound velocity and λ is the phonon mean free path.

Figure 3A:
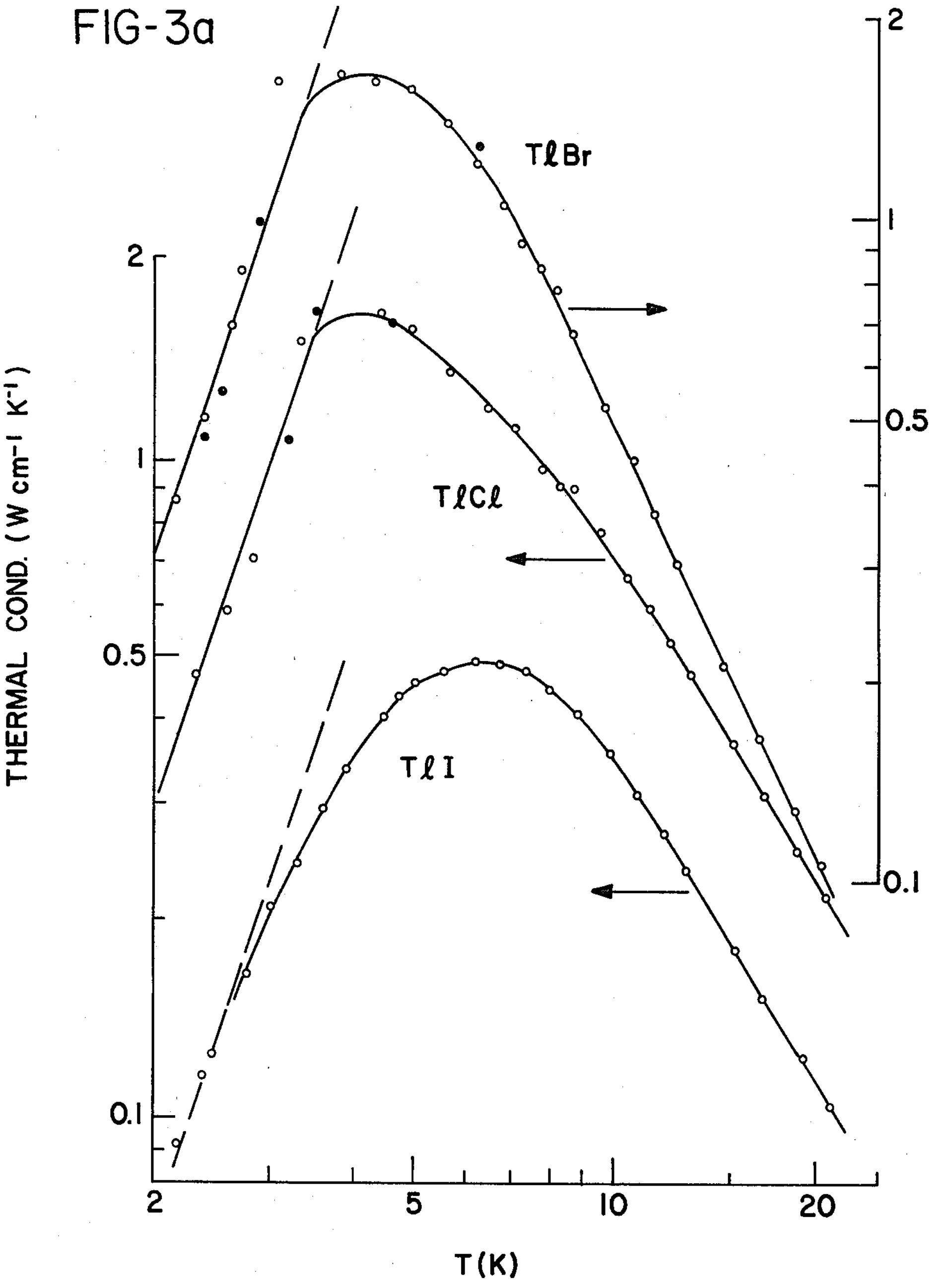
FIG. 3*a* is a graph of the thermal conductivity in watts per centimeter per degree Kelvin of thallous bromide, thallous chloride, and thallous iodide versus temperature in degrees Kelvin with arrows indicating which vertical scale is to be read for determining thermal conductivity values.
Figure 3B:
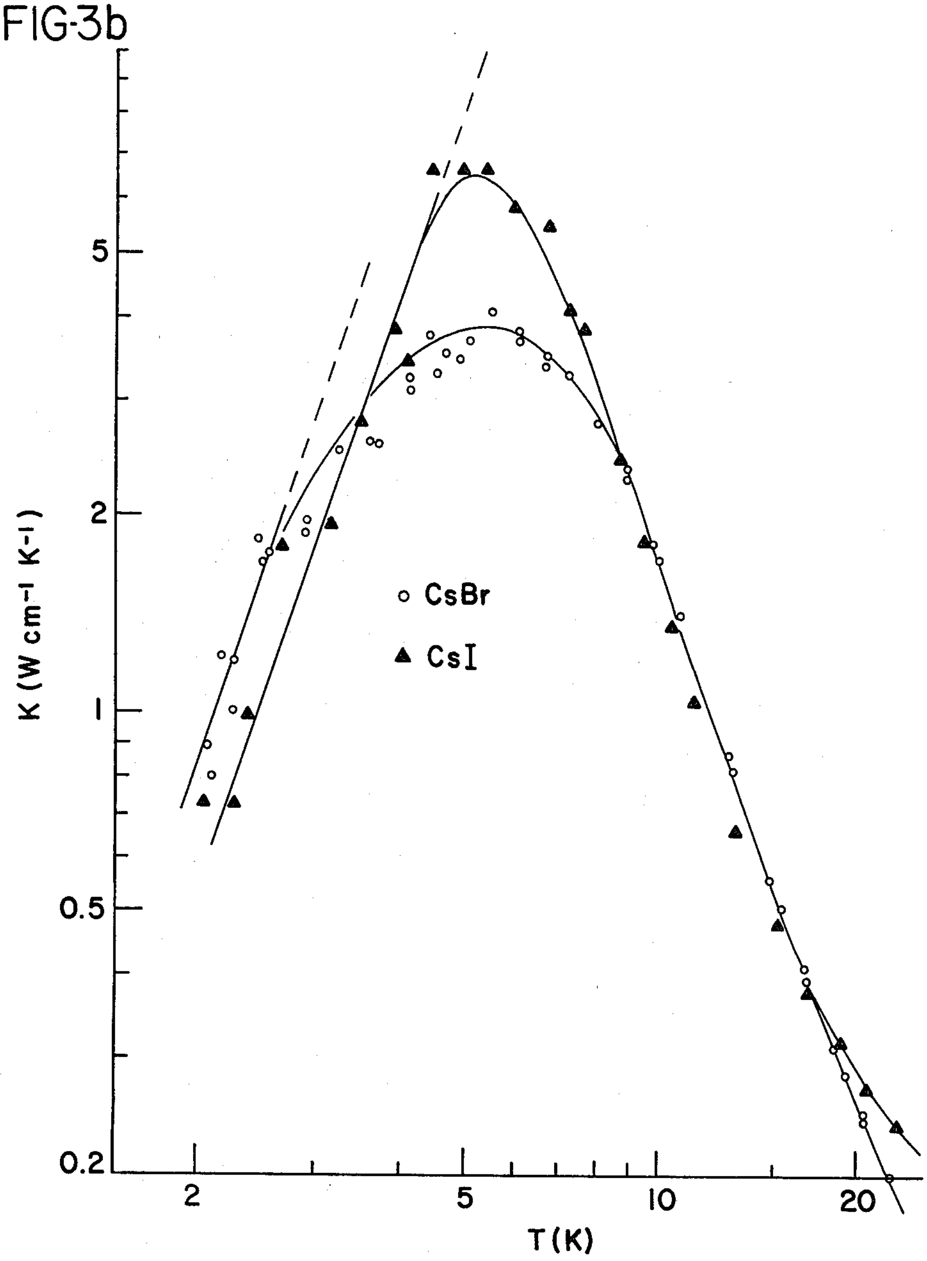
FIG. 3*b* is a graph of the thermal conductivity in watts per centimeter per degree Kelvin of cesium bromide and cesium iodide versus temperature in degrees Kelvin.

As the temperature of a composition is lowered, C decreases (see FIG. 1) but λ rapidly increases so that K also increases (see FIGS. 3a and 3b). Eventually, λ becomes so large that it equals a "characteristic dimension" in the composition. When this occurs, λ becomes a constant, $\lambda_B$, and the value of K drops as the temperature is further lowered (see FIGS. 3a and 3B). If the "characteristic dimension" of a composition is in fact its thickness when applied as a coating, then its thermal conductivity will be decreased as coating thickness is decreased.

The characteristic dimensions for the thallous and cesium halides of the present invention can be estimated from the above equation using the values for C and K from FIGS. 1, 3a, and 3b and using $v=2\times10^5$ cm/sec (the published value for TlBr and a good approximation for the other halides). The results are reported in Table II below:

TABLE II

| | $\lambda_B$ (cm) | $\lambda_B$ ($10^{-3}$ in.) |
|---|---|---|
| TlBr | 0.018 | 7.1 |
| TlCl | 0.009 | 3.5 |
| TlI | 0.002 | 0.8 |
| CsBr | 0.056 | 32.0 |
| CsI | 0.030 | 11.8 |

As can be seen, the large thermal conductivities for the thallous and cesium halides shown in FIGS. 3a and 3b will be retained until their respective layer thicknesses are less than the values of $\lambda_B$ in Table II. Thus, for example, thallous chloride has excellent thermal conductivity and specific heat properties which should be maintained in coating thicknesses down to about 3.5 mils. The data in the drawing figures and Table II show a wide variety of thermal properties and $\lambda_B$ values which can produce a number of combinations of properties suitable for the variety of operating conditions encountered in superconducting devices.

Additionally, because of their ductility, the thallous and cesium halides of the present invention can be extruded onto wires. This is accomplished by heating the halides near their respective melting points and then forcing the wire and halide compound simultaneously through a die orifice. Such a technique is known for applying organic polymeric coatings to wires, but it is not believed to have been previously used with respect to inorganic ceramic dielectric materials because of their brittleness. Alternatively, the thallous and cesium halides of the present invention can be dip coated onto wires by drawing the wire through a molten bath of the halide compound.

In coating superconducting wires, it has been found that the application of an initial very thin coating of lead or a lead-tin alloy onto the wire may improve the adherence of the halide coating to the wire. Use of such a lead or lead-tin alloy coating has the additional advantage of reducing the thermal resistance between the wire and the halide coating. It is believed that this is due to the good acoustic match between lead or a lead-tin alloy and the halides of the present invention.

With respect to commercial superconducting wire compositions, niobium-titanium alloy superconductor cannot be heated above 400° C. for extended periods of time so that the thallous halides, which have melting points of about 400° C., would be ideally suited as coating materials. Niobium-tin superconducting alloy is diffusion reacted at temperatures from 600°–700° C. so that the cesium halides, which have melting points of 620°–640° C. would be well suited as coating materials.

The use of thallous and cesium halides as coating materials for superconducting wires not only provides excellent dielectric insulation but also provides thermal stability. A superconducting wire or bundle of wires can develop a so-called "hot spot" during operation for a number of reasons. If this "hot spot" propagates along the wire, the metal so affected may lose its superconducting property. The large specific heats of the halide coatings of the present invention act as heat sinks for the "hot spot", and the large thermal conductivities of the coatings aid in the transmission of heat to a surrounding liquid helium bath. Thus, the specific heat and thermal conductivity properties of the coating can be used to encourage nucleate boiling at the coating-helium interface to transfer heat away from the wire. Because of the wide variety of operating conditions encountered in superconducting motors, generators, magnets, and the like, the wide variety of properties possessed by the thallous and cesium halides of the present invention can be matched to the specific need.

While the compositions and methods herein described constitute preferred embodiments of the invention, it is to be understood that the invention is not limited to these precise embodiments, and that changes may be made in either without departing from the scope of the invention, which is defined in the appended claims.

What is claimed is:

1. In combination, a superconducting metal wire having an electrically insulating coating thereon, said electrically insulating coating comprising a mixture of components X and Y, where X is selected from the group consisting of thallous chloride, thallous bromide, thallous iodide, cesium bromide, and cesium iodide, and where Y is selected from the group consisting of thallous chloride; thallous bromide; thallous iodide; cesium bromide; cesium iodide; and epoxy resin; $AB_2O_4$, where A is a Group IIB metal ion with or without other divalent metal ions and B is chromium ion with or without other trivalent metal ions; $AB_2O_6$, where A is manganese or nickel ion or both, with or without other divalent metal ions and B is niobium, tantalum, or both; and $A_2BCO_6$, where A is lead ion with or without other divalent metal ions, B is gadolinium or manganese with or without other trivalent metal ions, and C is niobium, tantalum or both.

2. The article of claim 1 in which the thickness of said coating is ½ to 1/50 times the diameter of said wire.

3. The article of claim 1 or 2 in which a layer of lead or lead-tin alloy is interposed between said superconducting metal wire and said electrically insulating coating.

4. The process of electrically insulating and improving the enthalpy stabilization of a superconducting metal wire comprising coating the wire with a ceramic material comprising a mixture of components X and Y, where X is selected from the group consisting of thallous chloride, thallous bromide, thallous iodide, cesium bromide, and cesium iodide, and where Y is selected from the group consisting of thallous chloride; thallous bromide; thallous iodide; cesium bromide; cesium iodide; epoxy resin; $AB_2O_4$, where A is a Group IIB metal ion with or without other divalent metal ions and B is chromium ion with or without other trivalent metal ions; $AB_2O_6$ where A is manganese or nickel ion or both, with or without other divalent metal ions and B is niobium, tantalum, or both; and $A_2BCO_6$ where A is lead ion with or without other divalent metal ions, B is gadolinium or manganese with or without other trivalent metal ions, and C is niobium, tantalum or both.

5. The process of claim 4 in which said ceramic material is coated onto said wire by extruding said ceramic material with said wire through a die orifice.

* * * * *